(12) United States Patent
Xu et al.

(10) Patent No.: US 12,509,426 B1
(45) Date of Patent: Dec. 30, 2025

(54) CARBON-14 RADIOISOTOPE-LABELED FLONICAMID AND SYNTHESIS METHOD THEREOF

(71) Applicant: Zhejiang Isotope Labelled Compounds Co., Ltd, Jiaxing (CN)

(72) Inventors: Lingfeng Xu, Jiaxing (CN); Zhipeng Yuan, Jiaxing (CN); Yaoyao Chen, Jiaxing (CN); Huaguang Li, Jiaxing (CN); Bin Dong, Jiaxing (CN)

(73) Assignee: Zhejiang Isotope Labelled Compounds Co., Ltd, Jiaxing (CN)

( * ) Notice: Subject to any disclaimer, the term of this patent is extended or adjusted under 35 U.S.C. 154(b) by 0 days.

(21) Appl. No.: 19/235,996

(22) Filed: Jun. 12, 2025

(30) Foreign Application Priority Data

Dec. 16, 2024 (CN) .......................... 202411846523.8

(51) Int. Cl.
*C07D 213/82* (2006.01)
(52) U.S. Cl.
CPC .................. *C07D 213/82* (2013.01)
(58) Field of Classification Search
CPC .................................................... C07D 213/82
See application file for complete search history.

(56) References Cited

FOREIGN PATENT DOCUMENTS

CN 115974779 A 4/2023

OTHER PUBLICATIONS

First Office Action received in Chinese Application No. 202411846523.8, issued Jan. 24, 2025.
Second Office Action received in Chinese Application No. 202411846523.8, issued Feb. 22, 2025.

*Primary Examiner* — Rebecca L Anderson
(74) *Attorney, Agent, or Firm* — CM Law PLLC; Robert C. Klinger (57) ABSTRACT

Provided is a method for synthesis of carbon-14 radioisotope-labeled flonicamid. Carbon-14 radioisotope is labeled on a pyridine ring in a flonicamid molecule. Carbon-14-labeled barium carbonate is adopted as a radioisotope raw material and then subjected to a reaction with concentrated sulfuric acid to release carbon-14-labeled carbon dioxide, and the carbon-14-labeled carbon dioxide is then subjected to reactions such as reduction, formylation, dehydration, substitution, cyclization, and amide condensation to synthesize a target product.

9 Claims, 3 Drawing Sheets

FIG. 1

| Peak No. | Retention time (min) | Peak area (absorbance * relative retention time) | Peak area percentage (%) |
|---|---|---|---|
| Peak1 | 10.243 | 12545087 | 98.86 |
| Peak2 | 13.570 | 12797 | 0.10 |
| Peak3 | 14.890 | 15008 | 0.12 |
| Peak4 | 17.454 | 13514 | 0.11 |
| Peak5 | 18.421 | 103328 | 0.81 |
| Total | — | 12,689,734 | 100.00 |

CARBON-14 RADIOISOTOPE-LABELED FLONICAMID AND SYNTHESIS METHOD THEREOF

CROSS REFERENCE TO RELATED APPLICATION

This patent application claims the benefit and priority of Chinese Patent Application No. 2024118465238 filed with the China National Intellectual Property Administration on Dec. 16, 2024, the disclosure of which is incorporated by reference herein in its entirety as part of the present application.

TECHNICAL FIELD

The present disclosure relates to the technical field of radiochemical synthesis, and in particular to carbon-14 radioisotope-labeled flonicamid and a synthesis method thereof.

BACKGROUND

Flonicamid is a novel, low-toxicity pyridinecarboxamide insecticide, belonging to the insect growth regulator category. The flonicamid could effectively control piercing-sucking mouthparts pests across a wide range of crops, and has a unique action mechanism for targets. The flonicamid does not act on acetylcholinesterase and nicotinic acetylcholine receptors, but shows a potent neuroactive effect and a rapid antifeeding activity against aphids. Thus, the flonicamid exhibits particularly high efficacy in controlling the aphids. The flonicamid works by hindering sucking of pests. The pests stop the sucking soon after ingesting the flonicamid, and eventually starve to death. According to the electronic monitoring of sucking behaviors of insects, the flonicamid could prevent the penetration of styles of sucking pests such as the aphids into plant tissues, thereby playing a role. The flonicamid is characterized by high systemic activity, excellent translaminar conductivity, low dose, high efficacy, and long residual efficacy. The flonicamid does not have cross-resistance with organophosphorus, carbamate, and pyrethrin pesticides, and shows high eco-environmental compatibility. The flonicamid remains highly effective for organophosphorus-, carbamate-, and pyrethroid-resistant cotton aphids, and is also active for other piercing-sucking mouthparts pests.

In the current studies on the flonicamid, investigations of absorption, distribution, translocation, and residues of the flonicamid in plants and environmental behaviors of the flonicamid in water bodies and soil are largely confined to the detection of parent compounds by chromatography or chromatography-mass spectrometry. The above detection method predominantly focuses on an original form of the flonicamid, and rarely involves the detection of metabolites/degradation products of the flonicamid. Consequently, there is a lack of in-depth research regarding metabolic pathways and the environmental behaviors of the flonicamid. However, after entering the environment and the plants, the flonicamid undergoes a series of complex transformations. The metabolites/degradation products of the flonicamid may exhibit different properties and behavioral patterns from the parent compounds, and may have a comparable influence on all levels of an ecosystem to the parent compounds. As a result, the synthesis of radioisotope-labeled flonicamid becomes particularly important. Based on the traceability of a radioisotope, a path of the flonicamid in the plant from absorption to subsequent distribution in various tissues and organs and transfer dynamics of the flonicamid during a growth cycle of the plant could be clearly monitored to accurately understand a complete metabolic process of the flonicamid in the plant. In terms of the exploration of the residues of the flonicamid, radioisotope labeling could also clearly distinguish between the residues of the parent compounds and the metabolites/degradation products of the flonicamid, to avoid improper determination of a total residue and hazard level caused by failed accurate identification of metabolites.

In summary, the synthesis of the radioisotope-labeled flonicamid is a key measure to break through the bottleneck of the current research on the flonicamid. This approach will provide robust technical support for elucidating the metabolic pathways, the environmental behaviors, etc. of the flonicamid, thereby propelling the related research into a more in-depth and comprehensive new stage.

SUMMARY

The present disclosure is intended to provide carbon-14 radioisotope-labeled flonicamid and a synthesis method thereof. In the present disclosure, flonicamid labeled with carbon-14 on a pyridine ring has been successfully synthesized. The carbon-14 radioisotope-labeled flonicamid can be used as a tracer for the tracing and other aspects of the plant antiviral agent flonicamid in plants, animals, soil, and water bodies.

In order to achieve the above objects, the present disclosure provides a method for synthesis of carbon-14 radioisotope-labeled flonicamid, including the following steps:

S1, under protection of an inert gas, introducing carbon-14-labeled carbon dioxide into a reaction system including a reducing reagent and an alcohol reagent, and conducting a reaction while stirring for a period of time; and after the reaction is completed, adding water to quench the reaction, and concentrating a resulting reaction solution to obtain a carbon-14-labeled formate;

S2, under protection of an inert gas, adding a polar aprotic solvent to the carbon-14-labeled formate and conducting dissolution; adding an alkyl halide, an inorganic alkali, and a molecular sieve to a resulting solution after the dissolution, and stirring at a temperature of −20° C. to 50° C. for a period of time; filtering a resulting material to obtain a filter cake; and subjecting the filter cake to washing and extraction with ethyl acetate (EA), drying, suction filtration, and concentration until dry in sequence to obtain carbon-14-labeled benzyl formate;

S3, under protection of an inert gas, dissolving the carbon-14-labeled benzyl formate in a dry alkyl halide; adding an ester substrate and an organic alkali to a solution obtained after the dissolving, adding a Lewis acid thereto at a temperature of −80° C. to 10° C., and stirring at room temperature for a period of time; conducting quenching by adding water and then separation; and subjecting a resulting aqueous phase to extraction with the EA, backwashing with a saturated sodium chloride solution once, drying, suction filtration, concentration until dry, and flash column chromatography in sequence to obtain ethyl $^{14}$C-(2E)-3-[(4-phenyl)benzyloxy]prop-2-enoate;

S4, under protection of an inert gas, dissolving the ethyl $^{14}$C-(2E)-3-[(4-phenyl)benzyloxy]prop-2-enoate in a polar aprotic solvent; adding an inorganic alkali and slowly adding a solution of (3E)-4-amino-1,1,1-trifluorobutyl-3-en-2-one in N,N-dimethylformamide (DMF) dropwise under an ice salt bath; naturally heating and conducting a reaction for a period of time; adding saturated ammonium chloride to quench the reaction, and conducting extraction with the EA; and combining resulting organic phases, and conducting backwashing with a sodium chloride solution, drying, suction filtration, concentration until dry, and flash column chromatography in sequence to obtain ethyl $^{14}$C-(E)-3-((E)-4,4,4-trifluoro-3-oxobutyl-1-en-1-yl)amino)acrylate;

S5, under protection of an inert gas, dissolving the ethyl $^{14}$C-(E)-3-((E)-4,4,4-trifluoro-3-oxobutyl-1-en-1-yl)amino)acrylat in a dry alcohol solution; adding a first inorganic alkali, and stirring at a temperature of −10° C. to 100° C. for a period of time; adding an aqueous solution of a second inorganic alkali thereto, and conducting a reaction while stirring at a temperature of 10° C. to 100° C. for a period of time; after the reaction is completed, concentrating a resulting reaction product to remove an alcohol solution, diluting with water, and conducting extraction with dichloromethane (DCM); adjusting a pH of a resulting aqueous phase to 1 to 2 with a 6 M hydrochloric acid solution, and conducting extraction with the EA; and combining resulting EA phases, and conducting drying and then concentration until dry to obtain $^{14}$C-4-(trifluoromethyl) nicotinic acid; and S6, under protection of an inert gas, dissolving the $^{14}$C-4-(trifluoromethyl) nicotinic acid in a dry alkyl halide; adding aminoacetonitrile hydrochloride, and adding an organic alkali and an organic synthesis reagent under an ice salt bath; naturally heating and conducting a reaction overnight; adding a 10% sodium bicarbonate aqueous solution to quench the reaction, and then conducting extraction with the DCM; and combining resulting organic phases, and conducting drying, then concentration until dry, and then flash column chromatography to obtain $^{14}$C-flonicamid.

The embodiments of the present disclosure provide a method for synthesis of carbon-14 radioisotope-labeled flonicamid. In the embodiments of the present disclosure, carbon-14 is labeled on a pyridine ring of flonicamid. The corresponding carbon-14 radioisotope-labeled flonicamid has a chemical formula shown in the following formula (I):

(I)

where an asterisk indicates a position for labeling of carbon-14.

In the method for synthesis of carbon-14 radioisotope-labeled flonicamid, a pyridine ring in a flonicamid molecule is selected as a position for labeling. Carbon-14-labeled barium carbonate is adopted as a radioisotope raw material and subjected to a reaction with concentrated sulfuric acid to release carbon-14-labeled carbon dioxide. The carbon-14-labeled carbon dioxide is converted into a carbon-14-labeled formate by a reducing reagent. The carbon-14-labeled formate is converted into an alkyl formate under alkaline conditions in the presence of an alkyl halide. Through a guiding effect of a position of carbonyl, carbon-14 is introduced to the α position of the carbonyl. Based on the strong nucleophilicity of amino in (3E)-4-amino-1,1,1-trifluorobutyl-3-en-2-one, a substitution reaction is completed. A self-cyclization is conducted under alkaline conditions to obtain 4-trifluoromethylnicotinic acid labeled with carbon-14 on the pyridine ring. The 4-trifluoromethylnicotinic acid labeled with the carbon-14 on the pyridine ring is subjected to a reaction with aminoacetonitrile hydrochloride through a condensation agent to obtain a carbon-14-labeled flonicamid product, namely, flonicamid labeled with the carbon-14 on the pyridine ring. The carbon-14-labeled flonicamid product has a molar activity of 1.0 mCi/mmol to 57 mCi/mmol, and a chemical purity and a radiochemical purity both higher than 98%. The carbon-14-labeled flonicamid product could be used as a tracer for the tracing and other aspects of plant antiviral agent flonicamid in plants, animals, soil, and water bodies.

In some embodiments, in step S1:
the carbon-14-labeled carbon dioxide is obtained by using carbon-14-labeled barium carbonate as an isotope raw material and conducting a fifth reaction with concentrated sulfuric acid, where the carbon-14-labeled barium carbonate has a molar activity of 1.0 mCi/mmol to 57 mCi/mmol.

In some embodiments, in step S1, the reducing reagent is any one or a combination of two or more selected from the group consisting of calcium borohydride, sodium borohydride, and potassium borohydride, and the alcohol reagent is any one or a combination of two or more selected from the group consisting of methanol, ethanol, propanol, and isopropanol. In some embodiments, the reducing reagent is the sodium borohydride and the alcohol reagent is the methanol; the formate obtained is sodium formate, and a corresponding reaction equation is as follows:

In some specific embodiments, carbon-14-labeled carbon dioxide is introduced into a reaction system including a reducing reagent and an alcohol reagent, and a reaction is conducted while vigorous stirring for 1 hour to 24 hours; and after the reaction is completed, water is added to quench the reaction and a resulting reaction solution is concentrated until dry to obtain a carbon-14-labeled formate.

The carbon-14-labeled formate prepared in step S1 of the present disclosure may be directly used for a reaction in step S2 without further purification.

In some embodiments, in step S2:
the carbon-14-labeled formate is converted into an alkyl halide formylation reagent under alkaline conditions in the presence of an alkyl halide.

In some embodiments, in step S2, the polar aprotic solvent is any one or a combination of two or more selected from the group consisting of dimethyl sulfoxide (DMSO), DMF, and tetrahydrofuran (THF). In some embodiments, the polar aprotic solvent is the DMF.

In some embodiments, in step S2, the alkyl halide is any one or a combination of two or more selected from the group consisting of benzyl chloride, benzyl bromide, benzyl iodide, chlorophenylethane, bromophenylethane, iodophenylethane, 1-iodo-3-phenylpropane, 1-chloro-3-phenylpropane, 1-bromo-3-phenylpropane, and 4-bromomethylbiphenyl; the inorganic alkali is any one or a combination of two or more selected from the group consisting of sodium carbonate, potassium carbonate, lithium carbonate, cesium carbonate, sodium bicarbonate, and potassium bicarbonate; and the molecular sieve is any one or a combination of two or more selected from the group consisting of a 3A molecular sieve, a 4A molecular sieve, and a 5A molecular sieve.

In some embodiments, the alkyl halide is the 4-bromomethylbiphenyl, the inorganic alkali is the potassium carbonate, and the molecular sieve is the 4A molecular sieve.

In some embodiments, specifically, DMF is added to the carbon-14-labeled formate and dissolution is conducted; an alkyl halide, an inorganic alkali, and a molecular sieve are added to a resulting solution after the dissolution, stirring is conducted at a temperature of −20° C. to 50° C. for 1 hour to 12 hours, and a resulting material is filtered to obtain a filter cake. The filter cake is washed with EA to obtain a washing solution. The washing solution is diluted with water, and subjected to extraction with EA three times, backwashing with a saturated sodium chloride solution twice, drying, suction filtration, and concentration until dry in sequence to obtain carbon-14-labeled benzyl formate. The corresponding carbon-14-labeled benzyl formate has a structural formula shown in the following formula (II):

(II)

In some embodiments, in step S3:
through a guiding effect of a position of carbonyl, carbon-14 is introduced to the α position of the carbonyl in a alkyl halide formylation reagent to obtain ethyl $^{14}$C-(2E)-3-[(4-phenyl)benzyloxy]prop-2-enoate.

In some embodiments, in step S3, the alkyl halide is any one or a combination of two or more selected from the group consisting of DCM, chloroform, carbon tetrachloride, and dichloroethane, and preferably the DCM.

In some embodiments, in step S3, the ester substrate is any one or a combination of two or more selected from the group consisting of methyl acetate, EA, propyl acetate, butyl acetate, isopropyl acetate, and benzyl acetate, and preferably the EA.

In some embodiments, in step S3, the organic alkali is any one or a combination of two or more selected from the group consisting of diisopropylethylamine, 1,8-diazabicyclo[5.4.0]undec-7-ene (DBU), and triethylamine, and preferably the triethylamine.

In some embodiments, in step S3, the Lewis acid is any one or a combination of two or more selected from the group consisting of aluminum chloride, boron trifluoride, ferric chloride, titanium tetrachloride, and tetraethyl titanate, and preferably the titanium tetrachloride.

In some embodiments, specifically, the carbon-14-labeled benzyl formate is dissolved in a dry alkyl halide. An ester substrate and an organic alkali are added to a solution obtained after dissolving, a Lewis acid is added thereto at a temperature of −80° C. to 10° C., and stirring is conducted at room temperature for 1 hour to 12 hours. Quenching is conducted by adding water to a resulting reaction solution, and then separation is conducted. A resulting aqueous phase is subjected to extraction with the EA twice, backwashing with the saturated sodium chloride solution once, drying, suction filtration, concentration until dry, and flash column chromatography in sequence to obtain ethyl $^{14}$C-(2E)-3-[(4-phenyl)benzyloxy]prop-2-enoate with a chemical formula shown in the following formula (III):

(III)

In some embodiments, in step S4:
based on strong nucleophilicity of amino in (3E)-4-amino-1,1,1-trifluorobutyl-3-en-2-one, the (3E)-4-amino-1,1,1-trifluorobutyl-3-en-2-one is subjected to a substitution reaction with the ethyl $^{14}$C-(2E)-3-[(4-phenyl)benzyloxy]prop-2-enoate to obtain ethyl $^{14}$C-(E)-3-((E)-4,4,4-trifluoro-3-oxobutyl-1-en-1-yl)amino)acrylate.

In some embodiments, specifically, in step S4, the polar aprotic solvent is any one or a combination of two or more selected from the group consisting of DMSO, DMF, and THF, and preferably the DMF.

In some embodiments, in step S4, the inorganic alkali is any one or a combination of two or more selected from the group consisting of sodium methoxide, sodium ethoxide, potassium tert-butoxide, and sodium hydride, and preferably the sodium hydride.

In some embodiments, specifically, the ethyl $^{14}$C-(2E)-3-[(4-phenyl)benzyloxy]prop-2-enoate is dissolved in a polar aprotic solvent. An inorganic alkali is added and a solution of (3E)-4-amino-1,1,1-trifluorobutyl-3-en-2-one in DMF is slowly added dropwise thereto under an ice salt bath. Heating is conducted naturally and a reaction is conducted for 5 hours to 24 hours. Saturated ammonium chloride is added to quench the reaction, and extraction is conducted with the EA three times. Resulting organic phases are combined, and subjected to backwashing with a sodium chloride solution, drying, suction filtration, concentration until dry, and flash column chromatography in sequence to obtain the ethyl $^{14}$C-(E)-3-((E)-4,4,4-trifluoro-3-oxobutyl-1-en-1-yl)amino)acrylate with a chemical formula shown in the following formula (IV):

(IV)

In step S5:
In some embodiments, in step S5, the alcohol solution is one selected from the group consisting of methanol, ethanol, propanol, and isopropanol, and preferably the methanol.

In some embodiments, in step S5, the first inorganic alkali is any one or a combination of two or more selected from the group consisting of sodium methoxide, sodium ethoxide, and potassium tert-butoxide. In some embodiments, the first inorganic alkali is the sodium methoxide.

In some embodiments, in step S5, the second inorganic alkali is any one or a combination of two or more selected from the group consisting of potassium hydroxide, sodium hydroxide, and lithium hydroxide, and preferably the sodium hydroxide.

In some embodiments, after a first inorganic alkali is added, stirring is conducted at a temperature of −10° C. to 100° C. for 1 hour to 24 hours, and after an aqueous solution of a second inorganic alkali is added thereto, stirring is conducted at a temperature of 10° C. to 100° C. for 1 hour to 24 hours.

In some embodiments, a resulting reaction product is concentrated to remove an alcohol solution, and diluted with water; and extraction is conducted with the DCM twice. A PH of a resulting aqueous phase is adjusted to 1 to 2 with a 6 M hydrochloric acid solution, and extraction is conducted with the EA four times. Resulting EA phases are combined, and subjected to drying, and then concentration until dry to obtain $^{14}$C-4-(trifluoromethyl) nicotinic acid shown in the following formula (V):

(V)

In step S6:

In some embodiments, in step S6, the alkyl halide is any one or a combination of two or more selected from the group consisting of DCM, chloroform, carbon tetrachloride, and dichloroethane, and preferably the DCM.

In some embodiments, in step S6, the organic alkali is any one or a combination of two or more selected from the group consisting of diisopropylethylamine, DBU, and triethylamine, and preferably the triethylamine.

In some embodiments, in step S6, the organic synthesis reagent is any one or a combination of two or more selected from the group consisting of 1-hydroxybenzotriazole (HOBT), O-benzotriazole-N,N,N',N'-tetramethyl-uronium-hexafluorophosphate (HBTU), O-(benzotriazol-1-yl)-N,N,N',N'-tetramethyluronium tetrafluoroborate (TBTU), 1-[bis (dimethylamino)methylene]-1H-1,2,3-triazolo[4,5-b] pyridinium 3-oxid hexafluorophosphate (HATU), and 1-ethyl-3-(3-dimethylaminopropyl) carbodiimide hydrochloride (EDCI), and preferably the HATU.

Specifically, a high-purity target product is dissolved in a dry alkyl halide, aminoacetonitrile hydrochloride is added, and an organic alkali and an organic synthesis reagent are added thereto under an ice salt bath. Heating is conducted naturally and a reaction is conducted overnight. A 10% sodium bicarbonate aqueous solution is added to to quench the reaction, and then extraction is conducted with the DCM. Resulting organic phases are combined, and subjected to drying, then concentration until dry, and then flash column chromatography to obtain $^{14}$C-flonicamid with a structural formula shown in the following formula (I):

(I)

The present disclosure further provides carbon-14 radioisotope-labeled flonicamid, where the carbon-14 radioisotope-labeled flonicamid is synthesized by the above method and has a structural formula shown in the following formula (I):

(I)

Compared with the prior art, some embodiments of the present disclosure have the following characteristics and beneficial effects: In the present disclosure, a pyridine ring in a flonicamid molecule is selected as a position for labeling. Carbon-14-labeled barium carbonate is adopted as a radioisotope raw material and subjected to a fifth reaction with concentrated sulfuric acid to release carbon-14-labeled carbon dioxide, and the carbon-14-labeled carbon dioxide is then subjected to reactions such as reduction, formylation, dehydration, substitution, cyclization, and amide condensation to synthesize flonicamid labeled with the carbon-14 on the pyridine ring. The synthesized flonicamid labeled with the carbon-14 on the pyridine ring has a definite labeling site, and has a high total yield, radiochemical purity, and chemical purity. Moreover, a nuclide carbon-14 is firmly labeled on the flonicamid molecule and is not easy to fall off, which could meet the requirements of tracing experiments in organisms and environments.

DETAILED DESCRIPTION OF THE EMBODIMENTS

The technical solutions of embodiments of the present disclosure are clearly and completely described below in conjunction with drawings in the embodiments of the present disclosure. Apparently, the embodiments are merely some rather than all of the embodiments of the present disclosure. All other embodiments obtained by persons of ordinary skill in the art based on the embodiments of the present disclosure shall fall within the scope of the present disclosure.

It should be understood by those skilled in the art that, in the description of the present disclosure, terms such as "longitudinal", "transverse" "upper", "lower", "front", "rear", "left", "right", "vertical", "horizontal", "top", "bottom", "inside", and "outside" indicate orientation or position relationships based on the drawings. These terms are merely intended to facilitate and simplify the description of the present disclosure, rather than to indicate or imply that a mentioned device or a component must have a specific orientation or must be constructed and operated in a specific orientation. Therefore, these terms should not be construed as a limitation to the present disclosure.

It should be understood that term "one" indicates "at least one" or "one or more". That is, in an embodiment, there may be one component, and in another embodiment, there may be a plurality of components. The term "one" could not be understood as a limitation to the number.

Example 1

Figure 1:
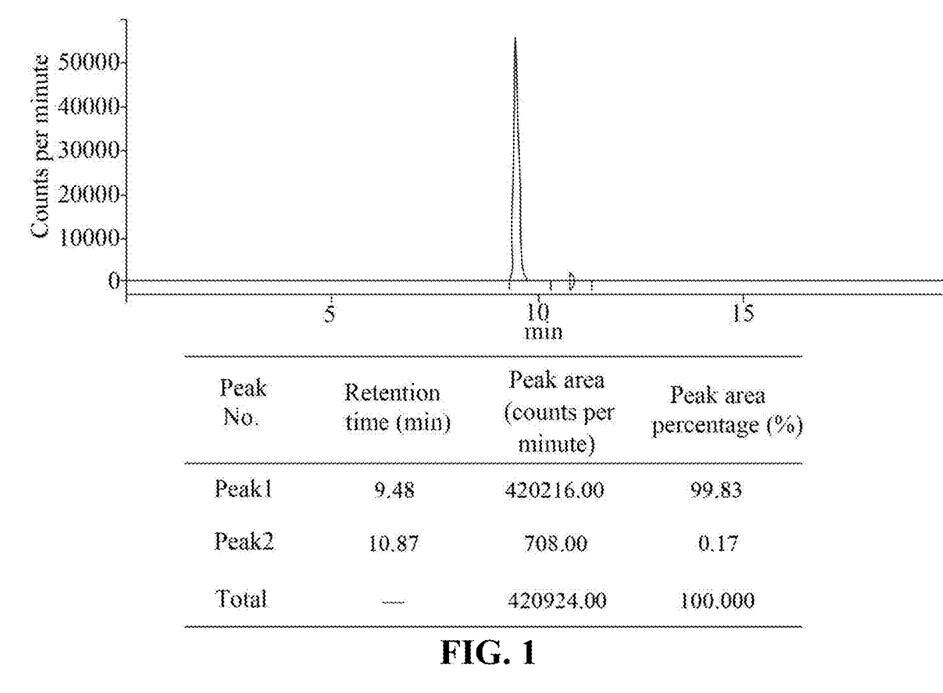
FIG. 1 shows a radiochromatogram of the carbon-14 radioisotope-labeled flonicamid according to an embodiment of the present disclosure.
Figure 2:
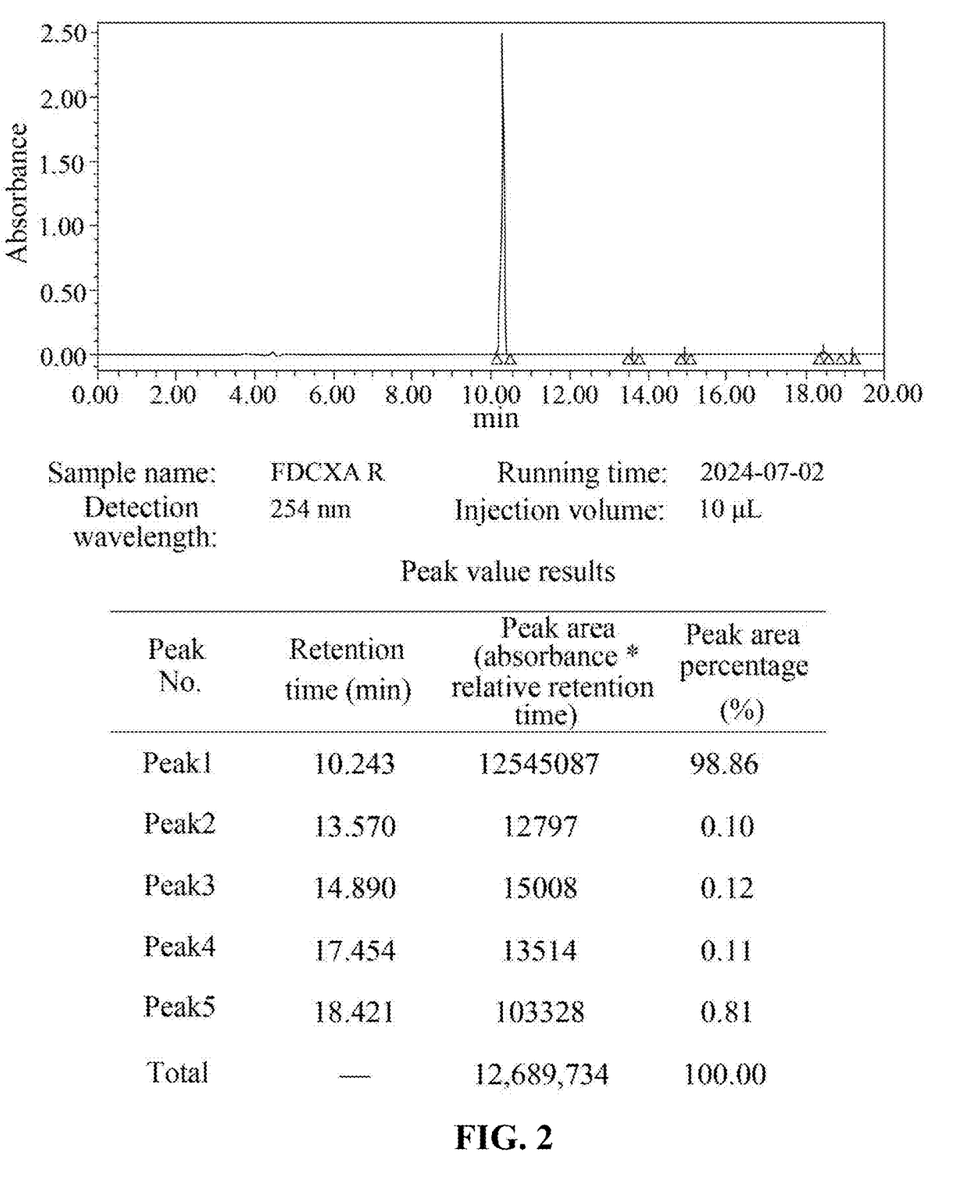
FIG. 2 shows a high-performance liquid chromatography (HPLC) chromatogram of the carbon-14 radioisotope-labeled flonicamid according to an embodiment of the present disclosure.
Figure 3:
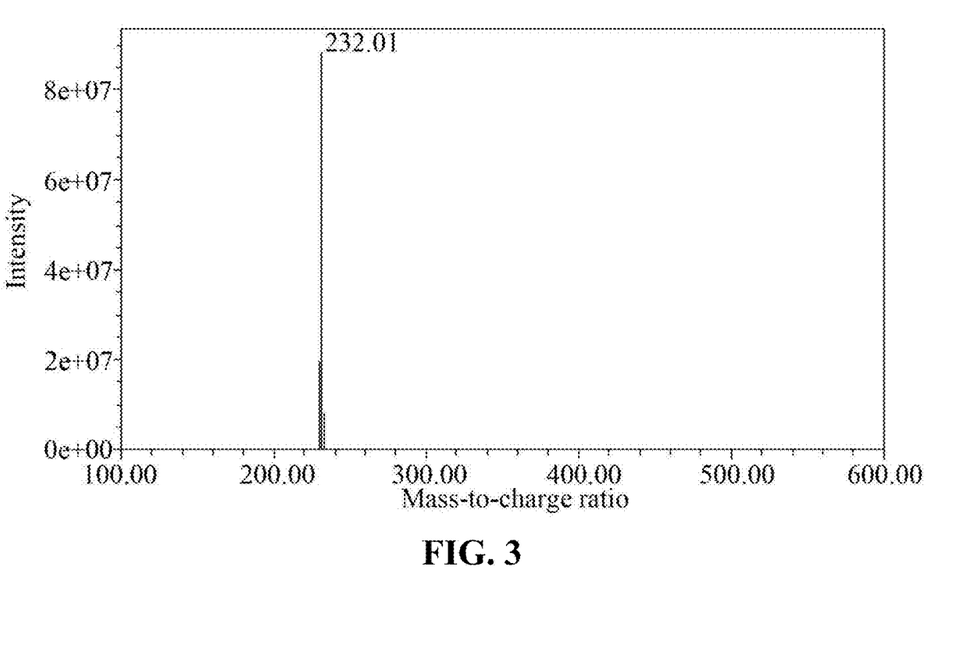
FIG. 3 shows a mass spectrometry spectrum of the carbon-14 radioisotope-labeled flonicamid according to an embodiment of the present disclosure.

The present example provided the following steps for synthesis of carbon-14 radioisotope-labeled flonicamid:

S1: In an ice water bath and under a nitrogen atmosphere, concentrated sulfuric acid (5 mL) was added to $^{14}$C-barium carbonate (598 mg, 3 mmol, 65.6 mCi/mmol) to obtain $^{14}$C-carbon dioxide. The $^{14}$C-carbon dioxide was introduced into a reaction system consisting of sodium borohydride (137 mg, 3.6 mmol), methanol (346 mg, 10.8 mmol), and ethanol (15 mL), and a reaction was conducted while vigorous stirring for 5 hours. After the reaction was completed, water (0.2 mL) was added to quench the reaction, and a resulting reaction solution was transferred to a 100 mL round-bottomed flask and concentrated until dry to obtain a crude product $^{14}$C-sodium formate, which could be directly used for a reaction in the next step without further purification. A reaction equation was as follows:

S2: Under protection of a nitrogen gas, DMF (10 mL) was added to the crude product obtained in the previous step and dissolution was conducted, biphenylbenzyl bromide (1.11 g, 4.5 mmol), sodium carbonate (318 mg, 3 mmol), and a molecular sieve (1.5 g) were added to a resulting solution after the dissolution, and stirring was conducted at 30° C. (12 hours). A resulting material was filtered to obtain a solid. The solid was washed with EA to obtain a washing solution. The washing solution was diluted with water (40 mL), and subjected to extraction with the EA (20 mL) three times, backwashing with a saturated sodium chloride solution (20 mL) twice, drying, suction filtration, and concentration until dry in sequence to obtain a crude product $^{14}$C-benzyl formate, which could be directly used for a reaction in the next step. A reaction equation was as follows:

S3: Under protection of argon, the $^{14}$C-benzyl formate was dissolved in dry DCM (10 mL), EA (327 mg, 3.7 mmol) and triethylamine (470 mg, 4.66 mmol) were added to a solution obtained after dissolving, and a solution of titanium tetrachloride in the DCM (705 mg, 3.7 mmol, 0.75 M) was added dropwise thereto at −15° C. for 12 minutes. Stirring was conducted at room temperature for 1.5 hours. Quenching was conducted by adding water (25 mL) to an obtained reaction solution, and then separation was conducted. A resulting aqueous phase was subjected to extraction with the EA (20 mL) twice, backwashing with the saturated sodium chloride solution (20 mL) once, drying, suction filtration, and concentration until dry in sequence. Purification was conducted by a silica gel column of 5 cm in a diameter and 20 g (300 mesh to 400 mesh), with polyethylene (PE) (100 mL), DCM:PE=1:8 (200 mL), and DCM:PE=1:6 (1 L) as eluents and a flow rate of 1 mL/second. An effluent of DCM:PE=1:6 was collected and concentrated until dry to obtain ethyl $^{14}$C-(2E)-3-[(4-phenyl)benzyloxy]prop-2-enoate (360 mg, 1.3 mmol, yield: 42%). A reaction equation was as follows:

S4: Under protection of nitrogen, the ethyl $^{14}$C-(2E)-3-[(4-phenyl)benzyloxy]prop-2-enoate (360 mg, 1.3 mmol) was dissolved in the DMF (5 mL). Sodium hydride (62 mg, 1.56 mmol) was added, and a solution of (3E)-4-amino-1,1,1-trifluorobutyl-3-en-2-one in DMF (217 mg, 1.56 mmol, 1 M) was slowly added dropwise thereto under an ice salt bath. Heating was conducted naturally and a reaction was conducted for 12 hours. Saturated ammonium chloride (10 mL) was added to quench the reaction, and extraction was conducted with the EA (15 mL) three times. Resulting organic phases were combined and subjected to backwashing with a sodium chloride solution (15 mL) twice, drying, suction filtration, concentration until dry, and flash column chromatography in sequence to obtain ethyl $^{14}$C-(E)-3-((E)-4,4,4-trifluoro-3-oxobutyl-1-en-1-yl)amino)acrylate. A reaction equation was as follows:

S5: Under protection of nitrogen, the ethyl $^{14}$C-(E)-3-((E)-4,4,4-trifluoro-3-oxobutyl-1-en-1-yl)amino)acrylate obtained in the previous step was dissolved in dry methanol (10 mL). A solution of sodium methoxide in methanol (2.4 mL, 10 mmol, 5.4 M) was added, and stirring was conducted at 70° C. for 3 hours. Then an aqueous solution of sodium hydroxide (104 mg, 2.6 mmol, 1 M) was added thereto, and a reaction was conducted while stirring at 50° C. for 2 hours. After the reaction was completed, a resulting reaction product is concentrated at 40° C. to remove a methanol solution, and diluted with water (20 mL), and extraction was conducted with the DCM (20 mL) twice. A pH of a resulting aqueous phase was adjusted to 1 to 2 with a 6 M hydrochloric acid solution, and extraction was conducted with EA (20 mL) 4 times. Resulting EA phases were combined, and subjected to drying, and then concentration until dry to obtain $^{14}C$-4-(trifluoromethyl) nicotinic acid (149 mg, 0.77 mmol, yield: 59%). A reaction equation was as follows:

S6: Under protection of a nitrogen gas, the $^{14}C$-4-(trifluoromethyl) nicotinic acid obtained in the previous step was dissolved in the DCM (25 mL). Aminoacetonitrile hydrochloride (86 mg, 0.92 mmol) was added to the $^{14}C$-4-(trifluoromethyl) nicotinic acid solution. Triethylamine (194 mg, 1.9 mmol) and HATU (351 mg, 0.92 mmol) were added thereto under an ice salt bath. Heating was conducted naturally and a reaction was conducted for 12 hours. A 10% sodium bicarbonate aqueous solution (20 mL) was added to a resulting reaction system to quench the reaction. Extraction was conducted with the DCM (20 mL) twice. Extraction was conducted with the EA (20 mL) twice. Resulting organic phases were combined, and subjected to drying, and then concentrated until dry. Purification was conducted by a silica gel column of 5 cm in a diameter and 20 g (300 mesh to 400 mesh), with PE (100 mL), DCM:MeOH=100:1 (100 mL), and DCM:MeOH=80:1 (1 L) as eluents and a flow rate of 1 mL/s. An effluent of DCM:MeOH=80:1 was collected and concentrated until dry to obtain $^{14}C$-flonicamid (128 mg, 0.55 mmol, yield: 72%). A reaction equation was as follows:

The $^{14}C$-flonicamid prepared in Example 1 was tested by radiochromatography, as shown in FIG. 1. It can be seen from FIG. 1 that the $^{14}C$-flonicamid has a radiochemical purity of 99.83%. The $^{14}C$-flonicamid was tested by high-performance liquid chromatography, as shown in FIG. 2. It can be seen from FIG. 2 that the $^{14}C$-flonicamid has a chemical purity of 99.86% (254 nm). The $^{14}C$-flonicamid was tested by mass spectrometry, as shown in FIG. 3. It can be seen from FIG. 3 that ESI-MS (+) is 231.98.

The present disclosure is not limited to the above optional embodiments, and anyone may derive other products in various forms under the enlightenment of the present disclosure. However, regardless of any changes in the shape or structure, any technical solutions the same as or similar to the present disclosure should fall within the scope of the present disclosure.

What is claimed is:

1. A method for synthesis of carbon-14 radioisotope-labeled flonicamid, comprising the following steps:
    S1, under protection of an inert gas, introducing carbon-14-labeled carbon dioxide into a reaction system comprising a reducing reagent and an alcohol reagent, and conducting a reaction while stirring for a period of time; and after the reaction is completed, adding water to quench the reaction, and concentrating a resulting reaction solution to obtain a carbon-14-labeled formate;
    S2, under protection of an inert gas, adding a polar aprotic solvent to the carbon-14-labeled formate and conducting dissolution; adding an alkyl halide, an inorganic alkali, and a molecular sieve to a resulting solution after the dissolution, and stirring at a temperature of −20° C. to 50° C. for a period of time; filtering a resulting material to obtain a filter cake; and subjecting the filter cake to washing and extraction with ethyl acetate (EA), drying, suction filtration, and concentration until dry in sequence to obtain carbon-14-labeled benzyl formate;
    S3, under protection of an inert gas, dissolving the carbon-14-labeled benzyl formate in a dry alkyl halide; adding an ester substrate and an organic alkali to a solution obtained after the dissolving, adding a Lewis acid thereto at a temperature of −80° C. to 10° C., and stirring at room temperature for a period of time; conducting quenching by adding water and then separation; and subjecting a resulting aqueous phase to extraction with the EA, backwashing with a saturated sodium chloride solution once, drying, suction filtration, concentration until dry, and flash column chromatography in sequence to obtain ethyl $^{14}C$-(2E)-3-[(4-phenyl)benzyloxy]prop-2-enoate;
    S4, under protection of an inert gas, dissolving ethyl (2E)-3-[(4-phenyl)benzyloxy]prop-2-enoate (3-$^{14}C$) in a polar aprotic solvent; adding sodium hydride and slowly adding a solution of (3E)-4-amino-1,1,1-trifluorobutyl-3-en-2-one in N,N-dimethylformamide (DMF) dropwise thereto under an ice salt bath; naturally heating and conducting a reaction for a period of time; adding saturated ammonium chloride to quench the reaction, and conducting extraction with the EA; and combining resulting organic phases, and conducting backwashing with a sodium chloride solution, drying, suction filtration, concentration until dry, and flash column chromatography in sequence to obtain $^{14}C$-(E)-3-((E)-4,4,4-trifluoro-3-oxobutyl-1-en-1-yl)amino);
    S5, under protection of an inert gas, dissolving the $^{14}C$-(E)-3-((E)-4,4,4-trifluoro-3-oxobutyl-1-en-1-yl)amino) in a dry alcohol solution; adding a solution of sodium methoxide in methanol, and stirring at a temperature of −10° C. to 100° C. for a period of time; adding an aqueous solution of sodium hydroxide thereto, and conducting a reaction while stirring at a temperature of 10° C. to 100° C. for a period of time; after the reaction is completed, concentrating a resulting reaction product to remove an alcohol solution, diluting with water, and conducting extraction with dichloromethane (DCM); adjusting a pH of a resulting aqueous phase to 1 to 2 with a 6 M hydrochloric acid solution, and conducting extraction with the EA; and combining resulting EA phases, and conducting drying and then concentration until dry to obtain $^{14}$C-4-(trifluoromethyl) nicotinic acid; and S6, under protection of an inert gas, dissolving the $^{14}$C-4-(trifluoromethyl) nicotinic acid in a dry alkyl halide; adding aminoacetonitrile hydrochloride, and adding an organic alkali and an organic synthesis reagent thereto under an ice salt bath; naturally heating and conducting a reaction overnight; adding water to a resulting reaction system to allow dilution, and then conducting extraction with the DCM; and combining resulting organic phases, and conducting drying, then concentration until dry, and then flash column chromatography to obtain $^{14}$C-flonicamid;

wherein the carbon-14 radioisotope-labeled flonicamid has a structural formula shown in the following formula (I):

(I)

wherein an asterisk indicates a position for labeling of carbon-14.

2. The method for synthesis of the carbon-14 radioisotope-labeled flonicamid of claim 1, wherein in step S1, the carbon-14-labeled carbon dioxide is obtained by using carbon-14-labeled barium carbonate as an isotope raw material and reacting the carbon-14-labeled barium carbonate with concentrated sulfuric acid, wherein the carbon-14-labeled barium carbonate has a molar activity of 1.0 mCi/mmol to 57 mCi/mmol.

3. The method for synthesis of the carbon-14 radioisotope-labeled flonicamid of claim 1, wherein in step S1,
the reducing reagent is any one or a combination of two or more selected from the group consisting of calcium borohydride, sodium borohydride, and potassium borohydride; and
the alcohol reagent is any one or a combination of two or more selected from the group consisting of methanol, ethanol, propanol, and isopropanol.

4. The method for synthesis of the carbon-14 radioisotope-labeled flonicamid of claim 1, wherein in step S2,
the polar aprotic solvent is any one or a combination of two or more selected from the group consisting of dimethyl sulfoxide (DMSO), DMF, and tetrahydrofuran (THF);
the alkyl halide is any one or a combination of two or more selected from the group consisting of benzyl chloride, benzyl bromide, benzyl iodide, chlorophenylethane, bromophenylethane, iodophenylethane, 1-iodo-3-phenylpropane, 1-chloro-3-phenylpropane, 1-bromo-3-phenylpropane, and 4-bromomethylbiphenyl;
the inorganic alkali is any one or a combination of two or more selected from the group consisting of sodium carbonate, potassium carbonate, lithium carbonate, cesium carbonate, sodium bicarbonate, and potassium bicarbonate; and
the molecular sieve is any one or a combination of two or more selected from the group consisting of a 3A molecular sieve, a 4A molecular sieve, and a 5A molecular sieve.

5. The method for synthesis of the carbon-14 radioisotope-labeled flonicamid of claim 1, wherein in step S2, the carbon-14-labeled benzyl formate has a structural formula shown in the following formula (II):

wherein the asterisk indicates the position for labeling of carbon-14.

6. The method for synthesis of the carbon-14 radioisotope-labeled flonicamid of claim 1, wherein in step S3,
the alkyl halide is any one or a combination of two or more selected from the group consisting of DCM, chloroform, carbon tetrachloride, and dichloroethane;
the ester substrate is any one or a combination of two or more selected from the group consisting of methyl acetate, EA, propyl acetate, butyl acetate, isopropyl acetate, and benzyl acetate;
the organic alkali is any one or a combination of two or more selected from the group consisting of diisopropylethylamine, 1,8-diazabicyclo[5.4.0]undec-7-ene (DBU), and triethylamine;
the Lewis acid is any one or a combination of two or more selected from the group consisting of aluminum chloride, boron trifluoride, ferric chloride, titanium tetrachloride, and tetraethyl titanate; and
the ethyl $^{14}$C-(2E)-3-[(4-phenyl)benzyloxy]prop-2-enoate obtained in the step S3 has a chemical formula shown in the following formula (III):

wherein the asterisk indicates the position for labeling of carbon-14.

7. The method for synthesis of the carbon-14 radioisotope-labeled flonicamid of claim 1, wherein in step S4,
the polar aprotic solvent is any one or a combination of two or more selected from the group consisting of DMSO, DMF, and THF; and
the ethyl $^{14}$C-(E)-3-((E)-4,4,4-trifluoro-3-oxobutyl-1-en-1-yl)amino)acrylate obtained in the step S4 has a chemical formula shown in the following formula (IV):

(IV)

wherein the asterisk indicates the position for labeling of carbon-14.

8. The method for synthesis of the carbon-14 radioisotope-labeled flonicamid of claim 1, wherein in step S5,
the alcohol solution is any one or a combination of two or more selected from the group consisting of methanol, ethanol, propanol, and isopropanol; and
the $^{14}$C-4-(trifluoromethyl) nicotinic acid obtained has a structural formula shown in the following formula (V):

(V)

wherein the asterisk indicates the position for labeling of carbon-14.

9. The method for synthesis of the carbon-14 radioisotope-labeled flonicamid of claim 1, wherein in step S6,
the alkyl halide is any one or a combination of two or more selected from the group consisting of DCM, chloroform, carbon tetrachloride, and dichloroethane;
the organic alkali is any one or a combination of two or more selected from the group consisting of diisopropylethylamine, DBU, and triethylamine; and
the organic synthesis reagent is any one or a combination of two or more selected from the group consisting of 1-hydroxybenzotriazole (HOBT), O-benzotriazole-N,N,N',N'-tetramethyl-uronium-hexafluorophosphate (HBTU), O-(benzotriazol-1-yl)-N,N,N',N'-tetramethyluronium tetrafluoroborate (TBTU), 1-[bis(dimethylamino)methylene]-1H-1,2,3-triazolo[4,5-b]pyridinium 3-oxid hexafluorophosphate (HATU), and 1-ethyl-3-(3-dimethylaminopropyl) carbodiimide hydrochloride (EDCI).

\* \* \* \* \*